(12) United States Patent
Hardy

(10) Patent No.: US 12,089,568 B2
(45) Date of Patent: Sep. 17, 2024

(54) ERGONOMIC BOWLS AND OTHER VESSELS FOR WATER AND FOODSTUFF

(71) Applicant: Old Dog New Tricks LLC, Carmel, CA (US)

(72) Inventor: Alan Hardy, Carmel, CA (US)

(73) Assignee: Old Dog New Tricks LLC, Bend, OR (US)

( * ) Notice: Subject to any disclaimer, the term of this patent is extended or adjusted under 35 U.S.C. 154(b) by 694 days.

(21) Appl. No.: 17/089,609

(22) Filed: Nov. 4, 2020

(65) Prior Publication Data
US 2022/0132797 A1    May 5, 2022

(51) Int. Cl.
*A01K 5/01* (2006.01)
*A47G 19/02* (2006.01)

(52) U.S. Cl.
CPC ............ *A01K 5/0114* (2013.01); *A47G 19/02* (2013.01)

(58) Field of Classification Search
CPC .......... A01K 5/0114; A01K 5/00; A01K 5/01; A01K 5/0128; A47G 19/02; A47J 45/062; A47J 45/06; A63B 37/0001; B65D 1/34; B65D 81/3841
USPC ................ 220/574, 770, 771, 669; 215/398; 119/61.5, 61.54, 72, 61.56; D7/533, 606, D7/628, 647, 393, 394, 901, 543, 564, D7/544; D30/129, 121, 125, 132, 133; D9/307, 668, 551; 473/127
See application file for complete search history.

(56) References Cited

U.S. PATENT DOCUMENTS

| | | | | |
|---|---|---|---|---|
| 995,114 | A | * 6/1911 | Clark | ................. A47G 23/0625 D7/554.2 |
| 1,394,540 | A | * 10/1921 | Diack | ...................... A61C 5/68 433/97 |
| 1,583,512 | A | 5/1926 | Worth | |
| 1,938,909 | A | * 12/1933 | Huff | ....................... A47G 19/02 220/574 |
| D112,179 | S | 11/1938 | Reinecke | |

(Continued)

FOREIGN PATENT DOCUMENTS

| | | |
|---|---|---|
| EP | 3994979 | 5/2022 |
| WO | 2009137798 | 11/2009 |

OTHER PUBLICATIONS

Extended European Search Report for European Application No. 21206184.0, mailed Apr. 11, 2022, 9 pages.
PetRageous Design, Pet Bowls, (https://www.petrageousdesigns.com/s.nl.sc.2/category.20966/.f) last accessed Jun. 4, 2021, publication date prior to application filing date.

(Continued)

*Primary Examiner* — Gideon R Weinerth
(74) *Attorney, Agent, or Firm* — Ganz Law, PC

(57) ABSTRACT

A vessel, e.g., a bowl, suited for holding water or foodstuff for use as a pet bowl or human kitchen houseware. The vessel is scaled for use by pets or humans. Generally, this means that an inner surface of the vessel defines a volumetric space of 60 cubic centimeters to 30 liters for holding water or foodstuff. The bowl has a water level, and, at the water level, the surface area of the bowl being 56 cm to 900 square cm. To facilitate lifting and gripping by one or two human hands of a user, the vessel's outer surface includes one or more graspable elements disposed between the top and bottom of the vessel. Each graspable element is configured to receive one or more fingers of a user so that the user can grasp or otherwise engage the graspable element and lift the bowl from a surface when the bowl is upright on the surface.

13 Claims, 11 Drawing Sheets

(56) References Cited

U.S. PATENT DOCUMENTS

| | | | |
|---|---|---|---|
| 2,142,811 A * | 1/1939 | Agonis | A47G 19/2205 220/675 |
| 2,327,078 A | 8/1943 | Herman | |
| 2,479,765 A * | 8/1949 | Mower | A47G 19/23 220/574 |
| D162,085 S | 2/1951 | Rogers | |
| 2,543,465 A | 2/1951 | Morey | |
| 2,548,035 A | 4/1951 | Horace | |
| D168,092 S | 11/1952 | Hedu | |
| D170,289 S | 8/1953 | Skipp | |
| 2,661,951 A * | 12/1953 | Uhas | A63B 37/0002 473/128 |
| 2,703,712 A * | 3/1955 | Obenchain | A63B 37/0002 473/128 |
| D196,375 S * | 9/1963 | Fraudetter | D7/901 |
| 3,198,377 A * | 8/1965 | Buckley | A47J 45/06 220/771 |
| 3,441,003 A | 4/1969 | Lister | |
| 3,611,998 A | 10/1971 | Loscalzo | |
| 3,622,036 A * | 11/1971 | Bongaerts | A01K 5/0114 119/61.5 |
| D254,416 S | 3/1980 | Abbate | |
| D256,205 S | 8/1980 | Bateman | |
| D257,068 S | 9/1980 | Imhoff | |
| D257,494 S * | 11/1980 | Imhoff | D30/129 |
| 4,257,353 A * | 3/1981 | Imhoff | A01K 5/0121 D30/129 |
| 4,712,698 A | 12/1987 | Greenberg | |
| 4,767,015 A | 8/1988 | Ho | |
| 4,886,016 A | 12/1989 | Atchley | |
| 4,967,918 A * | 11/1990 | Long | A47G 19/2205 215/385 |
| D312,895 S * | 12/1990 | Goetz | D30/129 |
| D314,310 S * | 2/1991 | Pyle | D7/548 |
| 5,000,123 A | 3/1991 | Morse et al. | |
| D320,859 S | 10/1991 | Malcolm | |
| 5,069,166 A | 12/1991 | Ahuna | |
| D326,168 S | 5/1992 | Smith | |
| D327,775 S * | 7/1992 | Turner | D3/271.9 |
| 5,215,203 A | 6/1993 | Malcolm | |
| D340,077 S * | 10/1993 | Turner | D3/271.9 |
| D351,522 S * | 10/1994 | Deimler | D7/545 |
| D371,721 S | 7/1996 | Redmond | |
| D383,254 S | 9/1997 | Feldman | |
| 5,758,604 A * | 6/1998 | Jørgensen | A63F 9/0078 119/711 |
| D400,400 S * | 11/1998 | Hurst | D7/515 |
| 5,857,427 A | 1/1999 | Kelley | |
| 5,865,147 A * | 2/1999 | Rubin | A01K 5/0114 119/711 |
| 5,868,272 A * | 2/1999 | Deal | B65D 25/2897 220/DIG. 13 |
| D412,605 S * | 8/1999 | Sharon | D30/129 |
| 5,979,361 A | 11/1999 | Willinger | |
| 6,026,982 A * | 2/2000 | Caruthers | A47G 19/22 220/772 |
| 6,032,824 A * | 3/2000 | Barrow | A01K 5/0135 220/625 |
| D424,757 S * | 5/2000 | Cooper | D30/129 |
| 6,230,653 B1 | 5/2001 | Tobin | |
| 6,237,532 B1 | 5/2001 | Derr | |
| D443,478 S | 6/2001 | Miller | |
| D454,990 S * | 3/2002 | Lorenzana | A61J 9/00 D30/129 |
| D465,384 S | 11/2002 | Schanzer | |
| D467,044 S * | 12/2002 | Tangolics | D30/129 |
| 6,516,747 B1 | 2/2003 | Willinger | |
| 6,520,369 B1 | 2/2003 | Cytacki | |
| D471,677 S * | 3/2003 | Northrop | D30/129 |
| D472,021 S * | 3/2003 | Northrop | D30/129 |
| 6,561,375 B1 * | 5/2003 | Nagy | B65D 1/34 206/460 |
| 7,104,413 B2 | 9/2006 | Liu | |
| D533,749 S | 12/2006 | Guzzini | |
| 7,198,171 B2 | 4/2007 | Liu | |
| D563,607 S * | 3/2008 | Northrop | D30/129 |
| D598,252 S | 8/2009 | West | |
| D602,651 S | 10/2009 | Modi et al. | |
| D636,945 S * | 4/2011 | Anderson | D30/129 |
| D659,296 S * | 5/2012 | Anderson | D30/129 |
| 8,342,350 B2 | 1/2013 | Jain | |
| D681,885 S * | 5/2013 | Pitter | D30/129 |
| 8,459,490 B1 * | 6/2013 | McTaggart | A47J 47/00 220/574 |
| 8,646,413 B2 | 2/2014 | Padia | |
| D703,393 S * | 4/2014 | Henley | D30/129 |
| D705,077 S * | 5/2014 | Martin | D9/551 |
| D721,860 S | 1/2015 | Parks | |
| D723,874 S | 3/2015 | Marques | |
| 8,997,691 B2 | 4/2015 | Lipscomb et al. | |
| 9,102,194 B2 | 8/2015 | Duckett | |
| D741,024 S * | 10/2015 | Liu | D30/129 |
| D748,946 S * | 2/2016 | Wirth, Jr. | D7/584 |
| D748,947 S * | 2/2016 | Wirth, Jr. | D7/584 |
| D749,366 S * | 2/2016 | Wirth, Jr. | D7/584 |
| D749,367 S * | 2/2016 | Wirth, Jr. | D7/584 |
| D755,447 S | 5/2016 | Andrews | |
| 9,392,767 B2 | 7/2016 | Talt | |
| D772,722 S * | 11/2016 | Kick | D9/551 |
| 9,814,332 B2 | 11/2017 | Zimmerman | |
| D820,528 S * | 6/2018 | Warwarick | D30/129 |
| D828,647 S | 9/2018 | Bergeron | |
| D832,529 S * | 10/2018 | Elliott | A47G 19/2205 D30/129 |
| D833,087 S * | 11/2018 | Nieves | D30/129 |
| D836,852 S | 12/2018 | Abbott | |
| D868,391 S * | 11/2019 | Townsend | D30/129 |
| D869,241 S | 12/2019 | Ellison et al. | |
| D871,159 S | 12/2019 | Ellison et al. | |
| 10,729,261 B2 | 8/2020 | Ellison et al. | |
| D909,819 S | 2/2021 | Ellison et al. | |
| D911,780 S | 3/2021 | Ellison et al. | |
| D918,488 S * | 5/2021 | Kerr | A01K 5/0114 D30/129 |
| D929,670 S * | 8/2021 | Gong | A47J 45/06 D30/129 |
| 11,111,056 B2 * | 9/2021 | Chisholm | B65D 21/0233 |
| D945,714 S * | 3/2022 | Kerr | D30/129 |
| D950,859 S * | 5/2022 | Delano | D30/129 |
| D953,654 S * | 5/2022 | Kerr | D30/129 |
| D959,061 S * | 7/2022 | Laemle | A47G 19/02 D30/129 |
| D980,549 S * | 3/2023 | Xiao | D30/129 |
| D988,806 S | 6/2023 | Harris | |
| D997,647 S * | 9/2023 | Mandel | D7/515 |
| D1,008,572 S * | 12/2023 | Clarke | D30/129 |
| D1,019,010 S * | 3/2024 | Su | D30/129 |
| 2005/0039689 A1 | 2/2005 | Mossmer | |
| 2006/0027585 A1 | 2/2006 | Clamage | |
| 2006/0179743 A1 | 8/2006 | Kishbaugh et al. | |
| 2007/0034161 A1 | 2/2007 | Thompson | |
| 2008/0105694 A1 | 5/2008 | Chen | |
| 2008/0289581 A1 | 11/2008 | Cox, Jr. et al. | |
| 2009/0126641 A1 | 5/2009 | Anderson et al. | |
| 2010/0077963 A1 | 4/2010 | Lipscomb et al. | |
| 2010/0101499 A1 * | 4/2010 | Gibson | A01K 7/005 119/61.5 |
| 2010/0275852 A1 * | 11/2010 | Lipscomb | A01K 5/0114 119/61.5 |
| 2010/0313814 A1 * | 12/2010 | Huang | A01K 5/0114 119/61.5 |
| 2012/0210941 A1 | 8/2012 | Brown | |
| 2012/0228312 A1 * | 9/2012 | Sutherland | A61J 9/00 215/11.1 |
| 2014/0158054 A1 * | 6/2014 | Clarke | A01K 5/0114 119/51.01 |
| 2014/0209619 A1 | 7/2014 | Born et al. | |
| 2014/0261202 A1 * | 9/2014 | Beatty | A01K 5/0128 119/61.54 |
| 2014/0326189 A1 | 11/2014 | Jain | |
| 2017/0055491 A1 * | 3/2017 | Hsu | B65D 21/0216 |
| 2017/0071376 A1 | 3/2017 | Vandenlangenberg | |

(56) References Cited

U.S. PATENT DOCUMENTS

| | | | |
|---|---|---|---|
| 2017/0127648 A1* | 5/2017 | O'Donnell | A01K 15/025 |
| 2018/0014505 A1 | 1/2018 | MacNeil | |
| 2018/0092477 A1* | 4/2018 | Duncan | A47G 19/02 |
| 2018/0132665 A1 | 5/2018 | Brown | |
| 2018/0168126 A1* | 6/2018 | Gibbs | B65D 1/36 |
| 2018/0343826 A1* | 12/2018 | Kumar | A01K 5/0135 |
| 2019/0248545 A1* | 8/2019 | Matteucci | A47G 19/2205 |
| 2019/0343070 A1 | 11/2019 | Padia | |
| 2020/0100607 A1 | 4/2020 | Ellison et al. | |
| 2020/0198837 A1* | 6/2020 | Chisholm | B65D 21/0233 |
| 2020/0329891 A1 | 10/2020 | Ellison et al. | |
| 2021/0219753 A1 | 7/2021 | Ellison et al. | |
| 2022/0095816 A1* | 3/2022 | Granara | A47G 19/02 |
| 2022/0132797 A1* | 5/2022 | Hardy | B65D 25/2885 220/574 |
| 2023/0024771 A1* | 1/2023 | Hardy | A47G 19/22 |
| 2023/0404027 A1* | 12/2023 | Zou | A01K 5/0128 |

OTHER PUBLICATIONS

Best Pet Supplies, Inc., Single Pet Bowl, (https://www.bestpethouse.com/products/accessories/pet-bowl/1083) last accessed Jun. 4, 2021, publication date prior to application filing date.

The Green Pet Shop Bamboo Cat Water Bowl, (https://www.amazon.com/Bamboo-Water-Bowl-Round-Angled-Blue/dp/B007TSOO8U) Last accessed Jun. 4, 2021, publication date prior to application filing date.

Catguru, Round Cat Dish, (https://www.cat-guru.com/collections/feeding-solutions/products/round-cat-dish?variant=16360367947842) last accessed Jun. 4, 2021, publication date prior to application filing date.

Frisco Double-Sided Ceramic Elevated Cat Bowl (https://www.chewy.com/frisco-double-sided-ceramic-elevated/dp/258589) last accessed Jun. 4, 2021, publication date prior to application filing.

Extended European Search Report for Application No. 23200794.8, mailed Feb. 8, 2024, 9 pages.

Office Action in U.S. Appl. No. 17/955,969, mailed May 21, 2024, 19 pages.

* cited by examiner

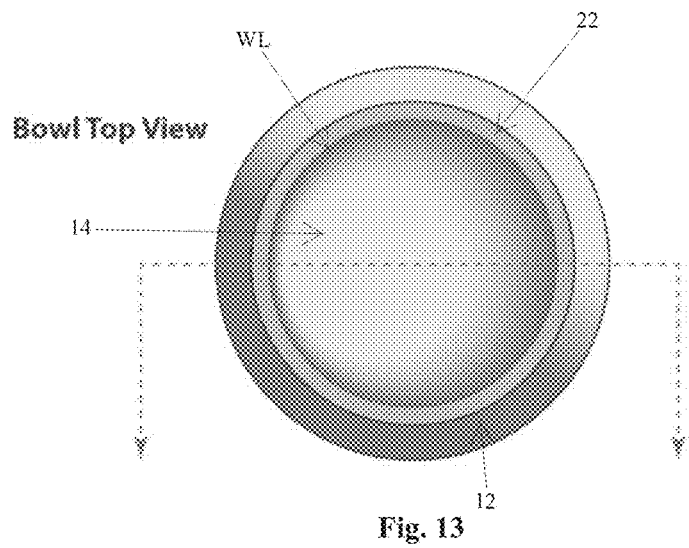
Fig. 13
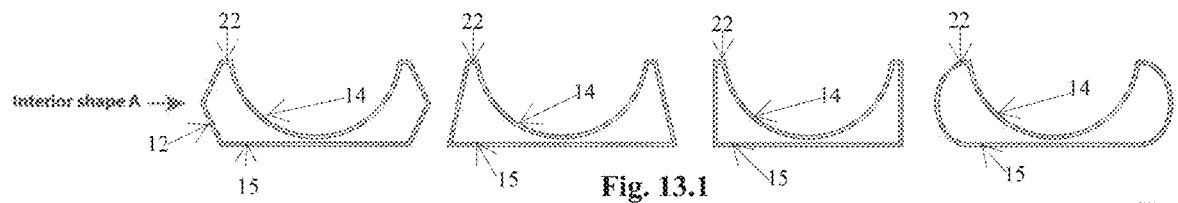
Fig. 13.1
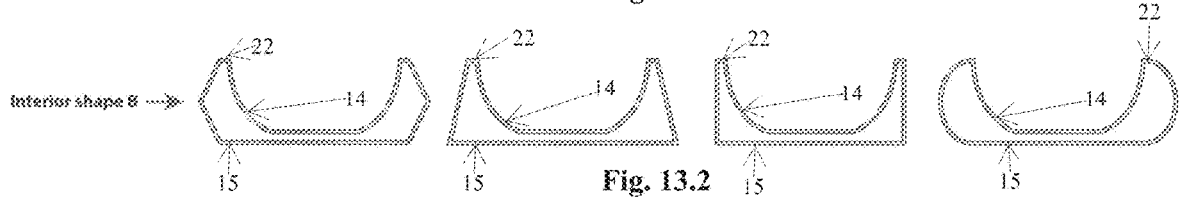
Fig. 13.2
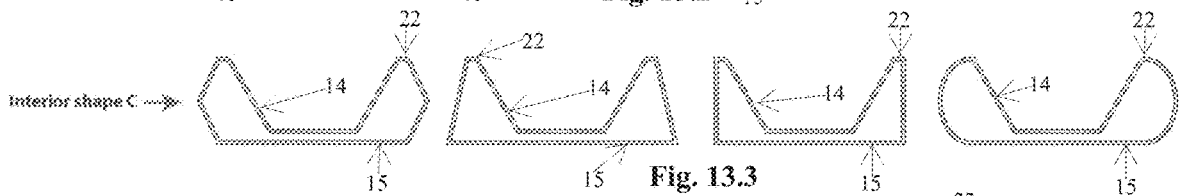
Fig. 13.3
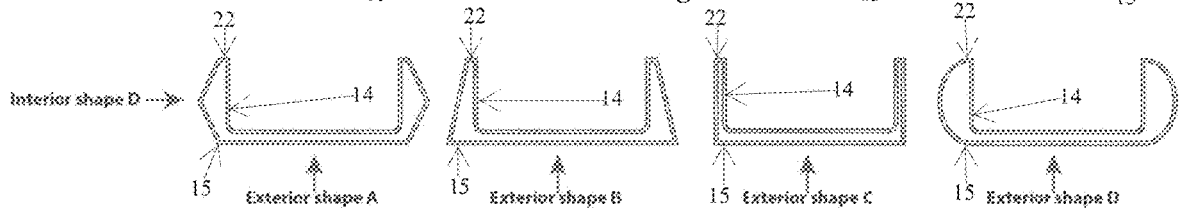
Fig. 13.4

(1.) 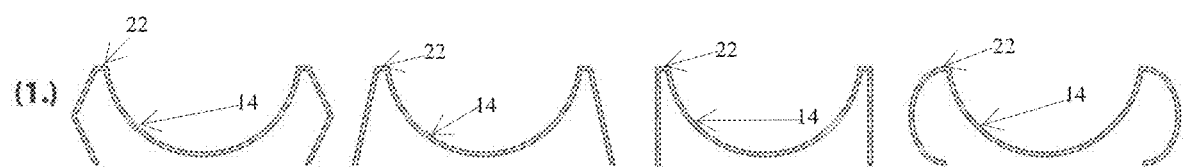
Fig. 13.5
(2.) 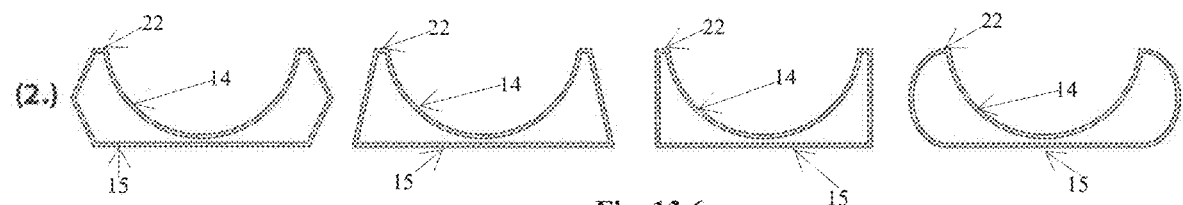
Fig. 13.6
(3.) 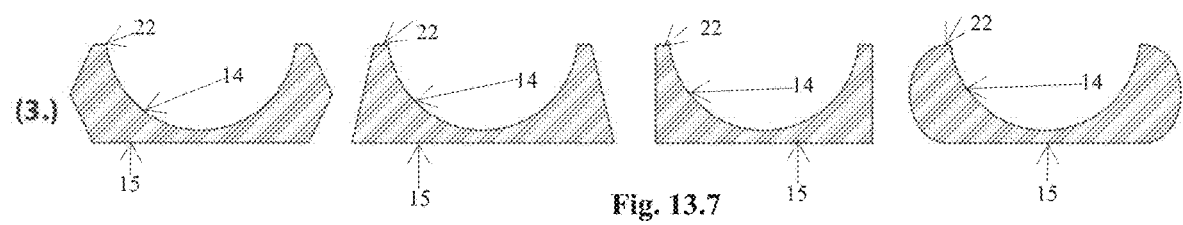
Fig. 13.7

ERGONOMIC BOWLS AND OTHER VESSELS FOR WATER AND FOODSTUFF

BACKGROUND

The inventive subject matter is generally directed to bowls and other vessels for holding liquids or solids. It is particularly directed to water or food bowls for pets, but it is also directed to houseware for humans. The inventive bowls and vessels are ergonomically configured with surface features that facilitate easy lifting and gripping of the item.

Conventional pet food and water bowls and household utility bowls have smooth sides, which, when coupled with a conical, rounded, vertical or other shape, can be difficult to pick up from the floor or other supporting surface—the user's hands and fingers are denied a graspable feature. A single hand will just slide over the smooth surface walls. Or the user must grasp over both the outer and inner walls at the same time, which may force the user to place fingers into a bowl and into its contents, often wetting or sullying the user's hand with contaminated or repulsive, water or spoiled food. The user may try to avoid this exposure by tightly and awkwardly clamping both hands on the outside of the vessel. Medium and large household utility bowls can be very heavy when filled with liquid or solids. The smooth sides prevent a secure hold on the bowl. The lack of secure grip on a smooth surfaced bowl may be compounded by normal household things coated on hands, e.g., flour, water, oil, and other substances.

Accordingly, there is a need for improved bowls and other vessels for pets and human houseware that enable a user to easily and securely grasp and pick-up the vessel from the exterior of the bowl without the need to put fingers inside the wet or dirty bowl, or without awkward, insecure clamping of hands on the slippery outer surface of the bowl or other vessel.

SUMMARY

This inventive subject matter overcomes the aforementioned and other problems in the prior art by providing a vessel that is configured with surface features that are easily grasped from the exterior of the vessel while it is on a grounded surface. The user does not need to place fingers into the vessel or under the vessel to grasp and lift it.

In certain embodiments, the inventive subject matter is directed to a vessel, e.g., a bowl, suited for holding water or foodstuff for use as a pet bowl or human kitchen houseware. The vessel is scaled for use by pets or humans. Generally, this means that an inner surface of the vessel defines a volumetric space of 60 cubic centimeters to 30 liters for holding water or foodstuff. The bowl has a water level, and, at the water level, the surface area of the bowl being 56 cm to 900 square cm. To facilitate lifting and gripping by one or two human hands of a user, the vessel's outer surface includes one or more graspable elements disposed between the top and bottom of the vessel. Each graspable element is configured to receive one or more fingers of a user so that the user can grasp or otherwise engage the graspable element and lift the bowl from a surface when the bowl is upright on the surface.

In the foregoing and other embodiments, at least the vessel's inner wall surface defining the volumetric space is a water impervious material.

In the foregoing and other embodiments, the vessel may consist of a shatterproof material.

In the foregoing and other embodiments, the vessel may consist of metal, rubber, and/or plastic to impart the water imperviousness and shatterproofness.

In the foregoing and other embodiments, the vessel may have a double wall construction, the outer wall being space from the inner wall along a majority of the perimeter of the vessel.

In the foregoing and other embodiments, the vessel may have a low center of gravity so that resists toppling over if bumped or nudged.

In the foregoing and other embodiments, the height of the vessel may be between 30 mm to 250 mm.

In the foregoing and other embodiments, the vessel's outer diameter at the bottom of the vessel may be plus/minus within 25% of the inner diameter at WL.

In the foregoing and other embodiments, the outer wall profile shape of the vessel may be generally conically, with the vessel tapering from a wider bottom to a narrower top.

In the foregoing and other embodiments, the outer wall profile may be different from the inner wall profile.

In the foregoing and other embodiments, at least the outer wall profile may have a widest portion at or below half its height.

In the foregoing and other embodiments, the outer wall profile may be a conical or annular shape.

In the foregoing and other embodiments, the graspable elements may not extend above outer surface and may be disposed in apertures that are configured for fingers to reach in.

In the foregoing and other embodiments, the graspable elements may include opposing sides that can be pinched by fingers.

In the foregoing and other embodiments, there may be at least three graspable elements, the graspable elements being spaced about the perimeter of the outer wall surface so that there is at least one every 180 degrees.

In the foregoing and other embodiments, there may be at least one graspable element every 120 degrees.

In the foregoing and other embodiments, there may be at least one graspable element every 90 degrees.

In the foregoing and other embodiments, there may be at least one graspable element present on the perimeter every 45 degrees or less.

In the foregoing and other embodiments, the graspable elements may be sized and arranged to provide a set of two of more finger holes or slots accessible by fingers from a single hand, at least two of the holes or slots being arranged at different heights on the outer wall surface.

In the foregoing and other embodiments, there may be three graspable elements in an arrangement like a bowling ball.

In the foregoing and other embodiments, there may be a plurality of spaced sets of the two or more finger holes or slots.

In the foregoing and other embodiments, the graspable elements may include handle like projections or structures.

In the foregoing and other embodiments, the vessel's graspable elements may also serve as legs or supports for the vessel.

In other embodiments, the inventive subject matter is directed to making vessels as contemplated above and elsewhere herein. For example, in one such possible embodiment is directed the steps of: (1) forming an inner wall surface and an outer wall surface, the inner and outer surfaces each having a profile shape, the inner surface defining a volumetric space of 60 cubic centimeters to 30 liters for holding water or foodstuff, the bowl having a water level, and, at the water level, the surface area of the vessel being 56 cm to 900 square cm; and (2) forming in the outer wall surface one or more graspable elements at the surface of the outer wall surface and between the top and bottom of the vessel, each graspable element being configured to receive one or more fingers of a user so that the user can grasp the graspable element and lift the bowl from a surface when the bowl is upright on the surface, without having to place the fingers within the volumetric space or under the vessel.

These and other embodiments are described in more detail in the following detailed descriptions and the figures.

The following is a description of various inventive lines under the inventive subject matter. The appended claims, as originally filed in this document, or as subsequently amended, are hereby incorporated into this Summary section as if written directly in.

The foregoing is not intended to be an exhaustive list of embodiments and features of the inventive subject matter. Persons skilled in the art can appreciate other embodiments and features from the following detailed description in conjunction with the drawings.

BRIEF DESCRIPTION OF THE DRAWINGS

The appended figures show embodiments according to the inventive subject matter, unless noted as showing prior art.

FIG. 13 shows a top view of yet another of a representative vessel with graspable elements and the taking of a selected cross section, which is used to illustrate various possible permutations of inner and outer wall profiles, as reflected in the series of profiles under each of FIGS. 13.1-13.7.

DETAILED DESCRIPTION

Figure 1:
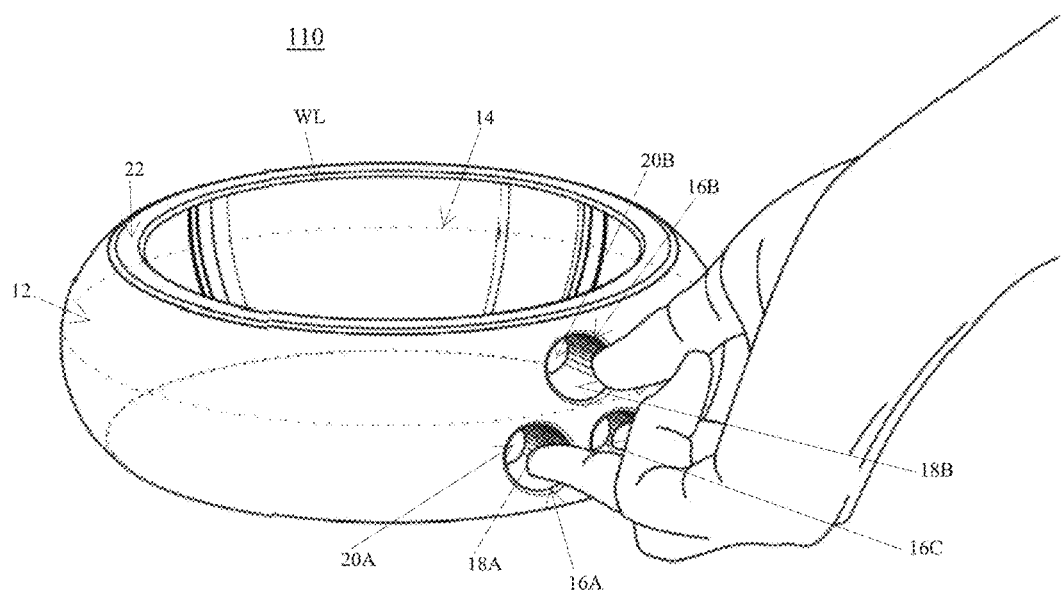
FIG. 1 shows a front perspective view of a vessel with graspable elements.

There are multiple ways that the inventive subject matter may be applied to a bowl or other vessel. While vessels for various purposes with many surface patterns are age old, the inventive subject is meant for vessels sized and shaped to hold water and food substances for serving pets around the size of dogs and cats, as well as humans. The vessels are sized and shaped to be liftable by one or two hands. They generally have walled sides and bottoms and open topsides. But the inventive subject matter could also be implemented in vessels that have closed or closeable tops.

The vessels' contemplated herein are made of relatively rigid materials sufficient to support water or food stuff. At least the vessels' inner wall surface for supporting water or other contents are inherently impervious to water or are treated to be such. The materials may be metal (e.g., stainless steel, copper, aluminum, titanium); polymers like plastic and rubber; natural, biomaterials (e.g., wood, bamboo, tempered glass and ceramics); and combinations of any of the foregoing materials. Any of these materials may have a smooth surface. (For at least housewares, ceramics and tempered glass are viable).

Generally, the foregoing materials, except ceramics and glass, are shatterproof under intended-use conditions. In contrast, materials like ceramics, glass, earthen clay or rock, cements, and plasters may not be ideal for use in some embodiments of the inventive subject matter because they may have sufficient porosity to not be impervious to water or they may be vulnerable to shattering or other breakage. They may also be difficult to configure with graspable features, be unduly heavy, or they may be too expensive for mass production.

Nonetheless, any of the foregoing materials may be used in the inventive subject matter depending on the application. For example, glass may not be suitable for use as pet bowl because of its intended use on a ground surface, making it vulnerable to being bumped around and breaking. However, a glass bowl for prepping or serving human food would be used on countertops and tables and is a fine choice for such applications.

The bowls or other vessels are typically are double-walled structures, namely there are inner and outer walls that are spaced apart. There may be some intervening material but as used herein a double wall bowl would have a majority of the space between inner and outer walls as open space. Double wall vessels may be open or closed at the bottom between the inner and outer walls, as indicated below, in more detail. The inventive subject matter is not limited to double-wall vessels—the bowls may also be fully solid between inner and outer wall surfaces or have a majority of solid in fill between the inner and outer wall surfaces.

The inventive subject matter also applies to single wall bowls that may result from different manufacturing methods and material applications. Injection molded, cast, ceramic or glass bowls could all be of single wall construction.

To enhance grip, embodiments of the inventive subject matter may have surface treatments of high grip materials (such as rubber or soft plastics). Similarly, texturing may be applied to all graspable surfaces or the bottom of the bowl for a more secure grip and to prevent sliding on the surface the bowl is placed upon.

Pet bowls typically have flat ground-contacting surfaces with straight or curved, smooth walls rising to a top rim. The flat ground-contacting surface is desirable because it helps keep the bowl stable from dislodging from its position. Therefore, fingers cannot be slipped under the bottom of the bowl to lift it. Accordingly, bowls of the inventive subject matter are often, but not necessarily always, directed to bowls and other vessels where there is a flat ground contacting surface.

Various shapes are used for pet bowls and other vessels so that they are not prone to toppling over if they are bumped or nudged. The common feature is that the vessels are shaped so that when they have a low center of gravity that resists toppling. A vessel with a low center of gravity is one where the center of gravity is at half the height of the vessel or lower. For example, as indicated in the Background section, certain shapes are often used for pet bowls. A conical shape is one example. The conical shape helps keep the bowl's center of gravity low by concentrating the mass of liquid or other contained substance in the bottom half of the bowl. In general, under the inventive subject matter, an empty vessel with a low center of gravity will also have a low center of gravity when full.

Accordingly, bowls of the inventive subject matter are often, but not necessarily always, directed to bowls and other vessels where is a low center of gravity. A low center of gravity may be provided in bowls and vessels that generally (but are not limited to) have a width to height aspect ratio of 16:3 to 1:1 though aspect ratios of 1:2 or greater may be adopted for specialty uses. In other cases, however, for example a bowl that generally tapers from bottom to top (e.g., a conical bowl), the bowl may have a low center of gravity but an aspect ratio where W/H is greater than 1:1 due to the mass in a filled bowl being concentrated in the bottom half of the bowl. Bowls with lower W/H aspect ratios, e.g., tall skinny bowls, may also have a low center of gravity by weighting the bottom of the bowl. In the case of pet bowls, it may be desirable to make bowls taller so that pets do not need to stoop low to reach the bowl.

Suitable vessels for use as pet bowls and houseware, will typically have a width or diameter of from 75 mm to 350 mm or more. Suitable vessels for use as pet bowls and houseware, will typically have a height of from 30 mm to 250 mm or more. These references are to measurements of the bowl's volumetric space (internal width/diameter and height) that define a volumetric space for holding food, water or other substance, the space being defined by the bottom surface, sidewalls and the level to which water would rise in the vessel without spilling over the sidewalls, when placed on a flat surface (Hereinafter that level may be referred to as the "Water Level" or "WL" in the Figures). The vessel's outer diameter at the bottom of the vessel would generally be plus/minus within 25% of the inner diameter at WL, but it could be within 40% or more, for example, in the case of bowls with decorative effects.

Suitable vessels for use as pet bowls and houseware, will typically have a cross-sectional area (surface area) at the Water Level that ranges from 56 cm to 900 square cm or more.

Suitable vessels for use as pet bowls and houseware, will typically have a volumetric space that ranges from 60 cubic centimeters to 30 liters.

The vessels according to the inventive subject matter may combine any one or more of the foregoing parameters of materials and material properties, aspect ratios, widths, heights, surface areas at WL, and volumes. In the following sections, various representative embodiments are disclosed. For example, in one, non-limiting, example, an inventive bowl is made of a smooth, impervious material metal or plastic. It has a W/H aspect ratio of 2 to 1 and holds 250 cubic centimeters, where W is the widest part of the bowl at the outer wall surface and the widest part is at half the height of the bowl or lower so that the bowl has a low center of gravity.

Having described some basic parameters that may be suitable for the contemplated pet bowls and houseware, the following section of this disclosure details various way to implement such bowls and others with inventive graspable features. The following is a general summary of several categories of graspable features:

SUMMARY OF REPRESENTATIVE INVENTIVE SUBJECT MATTER

Here follow some general summaries of inventive subject matter

I. Recessed Handle(s) Elements

A first solution contemplates inclusion of multiple holes or indentations on the exterior sidewall or surface of the bowl. These can look and function like the holes on a bowling ball or recessed cabinet handles. One or multiple recesses are sized, shaped and positioned to enable single or multiple fingers to securely grasp the bowl from the outer, bottom (or a combination of both) surface of the bowl, remaining clean and not contacting the interior surface of the bowl. Multiple deep grooves in the side of the bowl or around the circumference of the bowl are another solution enabling the user to easily grasp the raised or recessed ridges on the exterior of the bowl.

II. Raised Handle(s) Elements

A second solution contemplates a singular or multiple protruding shapes, raised bars, flutes or handle(s) like extensions/protuberance on the side of the bowl. These raised bars can be vertical, horizontal or angled in one or multiple locations around the perimeter of the bowl. These raised elements may be placed at even or odd intervals around the perimeter of the bowl. These raised or recessed elements may be spherical, flat, literal handles or shapes designed to look like an elegant vessel or sculptural elements with the purpose of offering single or multiple locations for gripping the bowl. The solution could include ornamental features in the graspable elements, e.g., animal heads or tails extending from the bowl functioning as handles.

III. Combination of Recessed and Raised Handle(s) Elements

A third solution contemplates inclusion of one or multiple holes or indentations on the exterior wall or surface of the bowl combined with raised elements adjacent to the hole or indentation can enhance the user's ability to grip the bowl. Combining both recessed and raised elements to form a grip able element can help improve the functionality of the handle, simplify manufacturing and offer additional design opportunities.

IV. Bowl Legs Functioning as Handles

A fourth solution contemplates inclusion of multiple legs, bars, fins, supporting structures or other elements, which can act as both handles, legs and supports enabling fingers to securely grip or grasp the bowl from the outside remaining clean. Bowl legs may incorporate different shapes and cross sections to be purely functional, functional and decorative or functional and whimsical. These legs can be ornamental, such as but not limited to a caricature of an octopus, or any animal real or fictitious. These leg/handles can also be designed to look like branches or plants. Legs or other supporting elements may be combined with holes in the sidewall of the bowl vessel.

In some embodiments, the graspable elements are finger openings of from 10 mm to 50 mm or more diameter or major width. In other embodiments the graspable elements are openings for multiple finger openings from 35 MM to 130+ MM. It is also possible that the graspable elements can run continuously around the entire circumference of the sidewall of the bowl vessel. It is also possible that the graspable elements can run continuously up (vertically or at an angle) the entire sidewall of the bowl vessel. In other embodiments. The graspable elements are positive or negative surface projections (indentations or extensions) that project outward and/or inward from 10 mm to 76 mm or more from the general outer surface of the vessel.

All the indentations or extensions in the various embodiments contemplated herein may be either the same or different material from that of the bowl itself. The vessel can be a monolithic (one piece) structure or assembled from multiple pieces of the same or different materials.

In general, there is at least on graspable element that can be engaged and lifted by pinching or hooking fingers on or through and against the element. In some embodiments, opposite sides of the vessel each include a graspable element. In yet other embodiments three or four or more graspable elements are spaced around the perimeter of the vessel so that the bowl can be grasped at different side positions. For example, rotating around a center point of the bowl, graspable elements could be located every 180, 120, 90, 60, 30, 10 degrees apart. The graspable elements could be separated by 0.125, 0.25, 0.5, 2, 3, 4, 5, 6, 7, 8, 9, 10, 15, 20, 25, 30, 40, 50 inches apart around. They can be spaced equidistantly from each other or at irregular spacings.

The following embodiments represent pet watering or food bowls or houseware bowls. However, using the principles of the inventive subject matter may be used in other kinds of vessels. Therefore, the following examples are illustrative and not intended to be limiting.

LIST OF REFERENCE NUMBERS LABELING THE FIGURES*

(*In successive Figures, the same or analogous elements have the same base numbers but are prefixed by the figure number. Alphabetical labels associated with reference numbers indicate one of a series of the same feature.)

WL top of bowls water level
10 bowl
12 outer walls of bowl (exterior surface)
14 interior surfaces of inner wall
15 bottom walls of bowl
16 graspable element
18 sidewalls defining the graspable element
20 inner walls of bowl (interior surface)
22 top rim walls, the area spanning between inner and outer walls
24 indented or notched area in or in between graspable elements FIG. 1: Recessed Handle(s) Elements.

In certain embodiments, the inventive subject matter contemplates inclusion of recessed features, e.g., multiple apertures or indentations, on the exterior side wall or surface of a bowl 110. In this embodiment, the outer surface 12 is free of protrusions and has a smooth continuous outer surface, except where interrupted by the apertures. The interior of the holes may be made from the same material of the bowl or a different material to enhance grip and comfort. The interior of the holes may have a texture different from the exterior of the bowl for improving the functionality/grip.

Bowl 110 has an outer wall 12 with a generally toroidal or annular shape. In this and other embodiments discussed below, the bowl has an inner wall 14 with an interior surface that defines a volumetric space for holding water or other contents. Water Level (WL) defines the top of the volume. The exterior surface of wall 14 is indicated by reference number 20.

The graspable elements 16A-C are defined by cylindrical sidewalls 18A-C, which engage the fingers and define the finger-receiving apertures or indentations. The apertures are tunnels with closed ends 20A-C As seen, the apertures look and function like the holes on a bowling ball. The apertures or indentations can also function like recessed cabinet handles. One or multiple recesses enabling fingers to securely grip the bowl from the outer or bottom surface of the bowl, remaining clean. The holes are sized and space for finger access for a range of normal human hand sizes. For example, holes may have center to center spacings of from less than 25 mm to greater than 50 mm. Two, three, three or four holes could be spaced the side of a bowl in an area of 25 to 160 square centimeters or more. The apertures or indentations have depth sufficient for a range of human finger sizes to recede into. Suitable diameters may be from 10 mm to 50 mm or more. Suitable depths may be from less than 10 mm to 76 mm or more.

Figure 3:
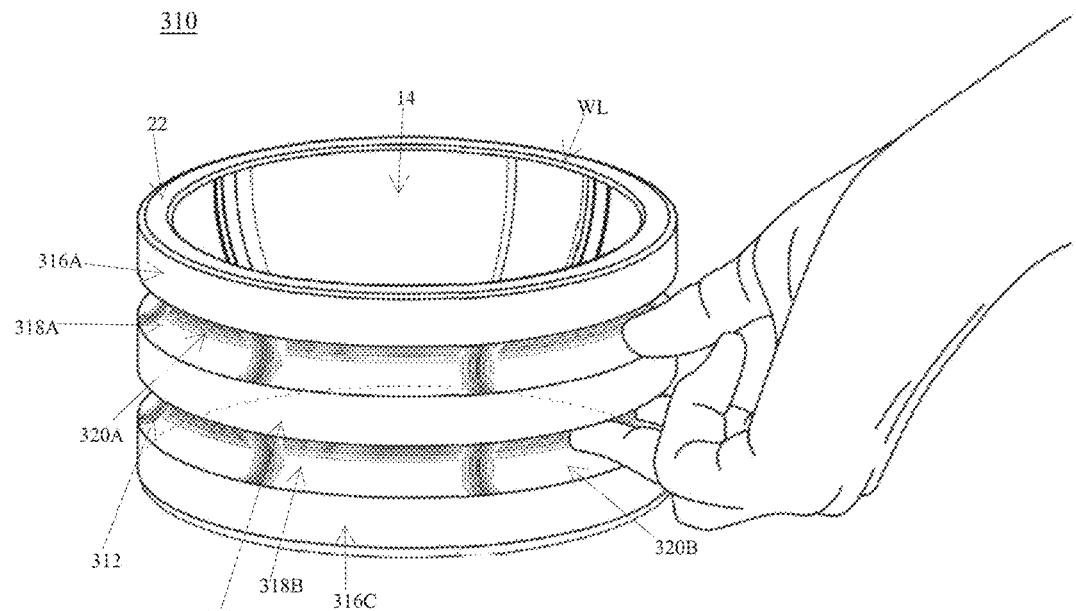
FIG. 3 shows a front perspective view of yet another alternative embodiment of a vessel with graspable elements.

Multiple deep grooves around the circumference of the bowl are another solution enabling the user to easily grasp the raised ridge or ridges on the outside of the bowl. The grooves can be oriented vertically or horizontally (as seen in FIG. 3, discussed below.)

Figure 2:
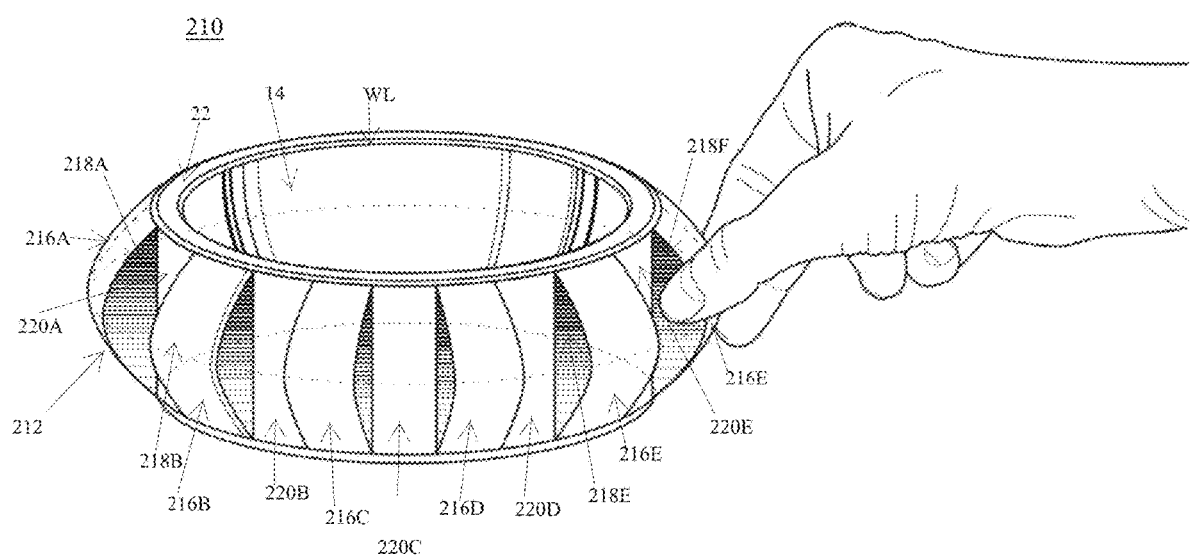
FIG. 2 shows a front perspective view of an alternative embodiment of a vessel with graspable elements.

FIG. 2—Combination of Recessed and Raised Handle(s) Elements.

In certain embodiments, the inventive subject matter contemplates graspable elements 216A-F in the form of single or multiple raised bars, flutes, or handle(s) like extensions/protuberance on the side of the bowl 210, which will allow lifting the bowl without touching the interior of the bowl. In FIG. 2, the bars are vertically oriented and seen spaced apart along intervals 220A-E on the bowl's inset inner wall 12. Each graspable element may be defined by two or more wall surfaces.

In the case of bowl 210, each graspable element 216 is defined by three wall surfaces 218A-F. For example, walls 218A and 218E are side walls and wall 218B is a front wall surface. As another possibility, the side walls in graspable elements 216 could be eliminated so that the front wall, e.g., wall 218A is a handle that fingers can slip under and over.

In addition to a vertical orientation, the graspable element could be horizontally or otherwise angularly oriented. These raised elements may be spaced evenly or irregularly around the circumference of the bowl in one location or multiple locations around the perimeter of the bowl. The raised or recessed elements may be designed to look like an elegant vessel or sculptural shape with the side benefit of offering single or multiple locations for gripping the bowl. Looking at FIG. 2, the arching elements 216A-F may be arranged equidistantly around the perimeter of inner wall 14 to define the outer surface profile 212 generally as a toroidal or annular shape like the embodiment of FIG. 1.

FIG. 3—Recessed Handle(s) Elements Inclusion of Multiple Holes or Indentations on the Exterior Side Wall or Surface of the Bowl.

FIG. 3 shows a bowl 310 with a series of three ridge-like, circumferentially extending graspable elements 316A-C. Side walls 318A-B define the elements. The sidewalls include a vertical face and horizontal faces, which merge into inner walls 320A-B. The sidewalls and inner walls define circumferential grooves between the graspable elements. These grooves or recesses can function like recessed cabinet handles. One or multiple recesses enabling fingers to securely grip the bowl from the outside, remaining clean. Multiple deep grooves around the circumference of the bowl are a solution enabling the user to easily grasp a single raised ridge or multiple ridges on the outside of the bowl.

Figure 4:
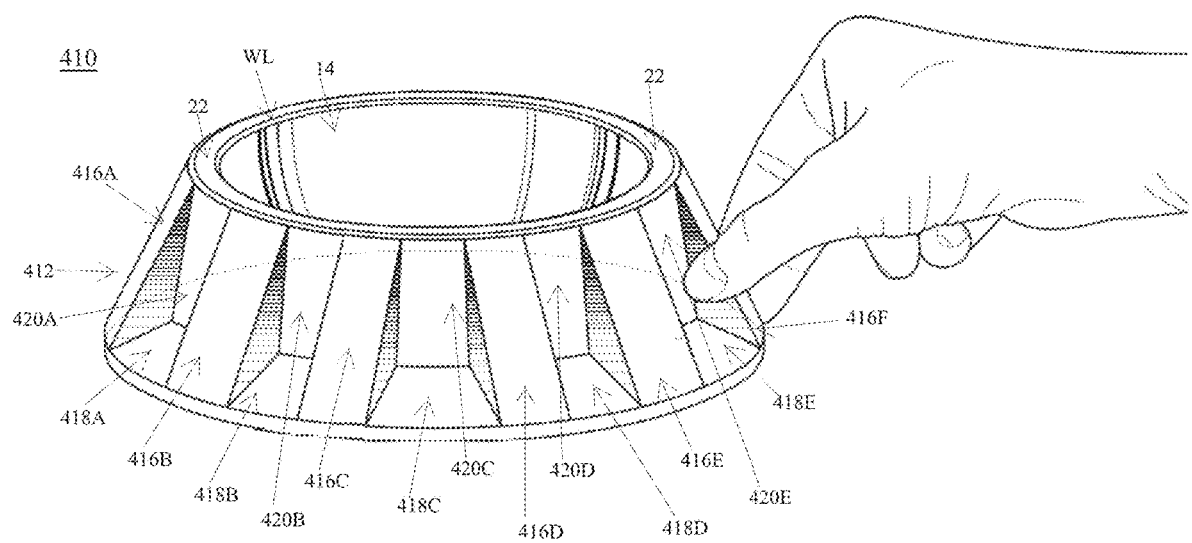
FIG. 4 shows a front perspective view of yet another alternative embodiment of a vessel with graspable elements.

FIG. 4—Combination of Recessed and Raised Handle(s) Elements.

The embodiment of FIG. 4 is like the embodiment of FIG. 2. In this case the bowl 410 has an outer profile of a truncated cone that tapers from the top of the Water Level to the bottom. The bowl has a plurality of graspable elements 416A-F in the nature of single or multiple triangular, rectangular, or organic raised bars, flutes, or handle(s) like extensions/protuberance on the side of the bowl. The elements allow lifting the bowl without touching the interior of the bowl. The raised bars can be vertical, horizontal, angled, or organic in shape and placement. These raised elements may be at even or odd intervals in one location or multiple locations around the perimeter of the bowl. These raised or recessed elements may be designed to look like an elegant vessel or sculptural shape with the side benefit of offering single or multiple locations for gripping the bowl.

Figure 5:
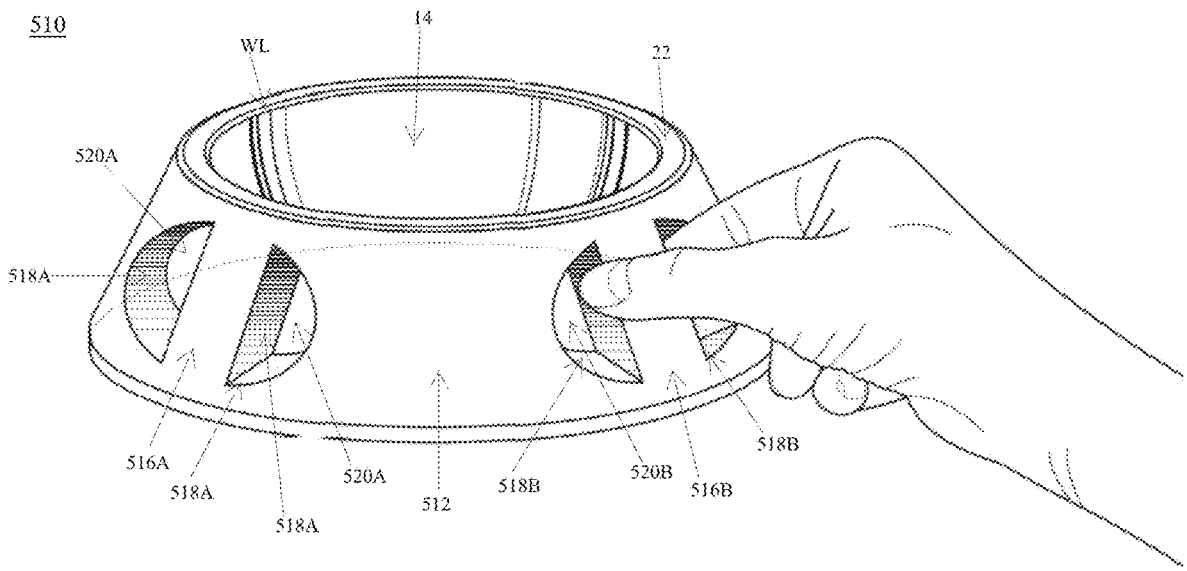
FIG. 5 shows a front perspective view of yet another alternative embodiment of a vessel with graspable elements.

FIG. 5—Recessed Handle(s) Elements.

The embodiment of FIG. 5 shows bowl 510 with an outer profile of a truncated cone that tapers from the top of the Water Level to the bottom. One or more graspable elements 516A-B are disposed in the outer wall. Each graspable element is a handle or bar disposed in an aperture in the outer wall 512. Like bowl 110, the remainder of the outer wall may be a smooth, unbroken surface.

Figure 6:
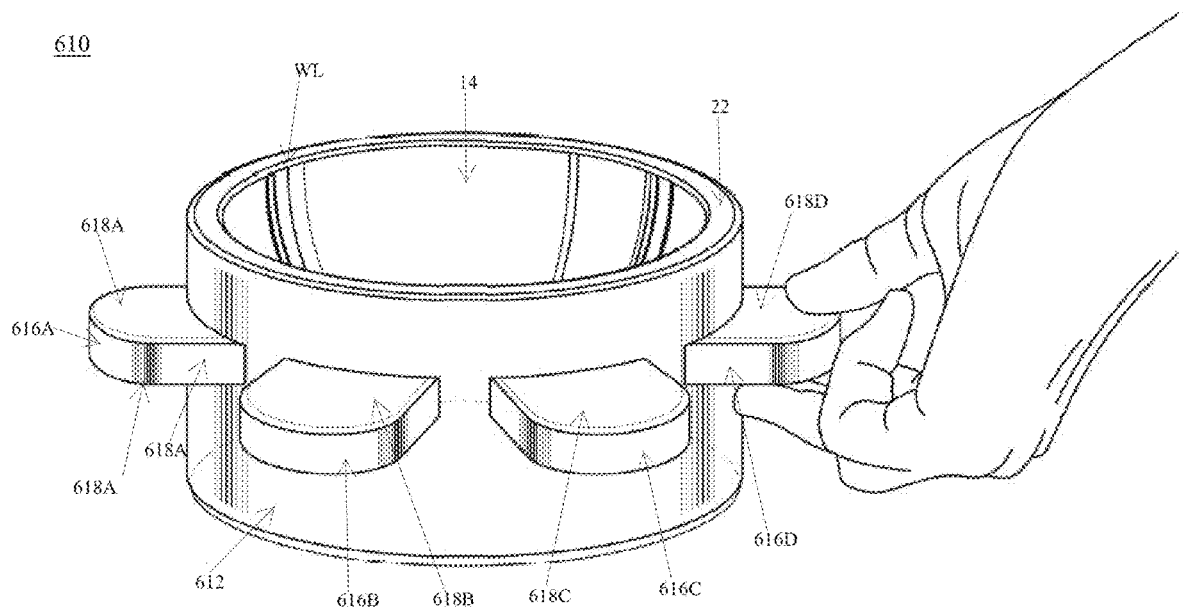
FIG. 6 shows a front perspective view of yet another alternative embodiment of a vessel with graspable elements.

FIG. 6—Raised Handle(s) Elements.

The embodiment of FIG. 6 shows bowl 610 with an outer profile in the general nature of a cylinder truncated. The diameter of outer wall 612 remains constant going from the top of the Water Level to the bottom (excepting the protruding graspable elements 616A-D. The surface of outer wall 612 is provided with a single or multiple protruding shapes, raised bars, flutes or handle(s) like extensions to allow lifting the bowl without touching the interior of the bowl. These protruding elements can be oriented vertically, horizontally, or otherwise angularly. In this example, the graspable elements are horizontally oriented and spaced equidistantly around the circumference of outer wall 612. The projections terminate in an ovular end.

The projecting graspable elements may be placed at even or odd intervals, in a single location or multiple locations around the perimeter of the bowl. These raised or recessed elements may be spherical, common handles or shapes designed to look like an elegant vessel or sculptural element with the side benefit of offering single or multiple locations for gripping the bowl. In this embodiment, like some of the others, the bowl's outer surface may be smooth and even (except of the graspable element).

Figure 7:
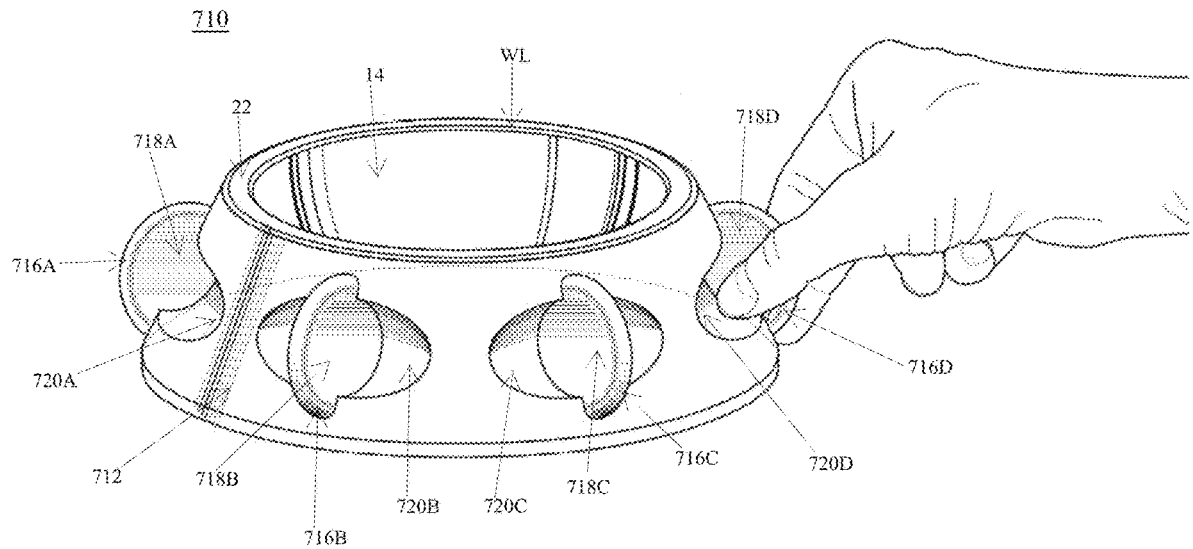
FIG. 7 shows a front perspective view of yet another alternative embodiment of a vessel with graspable elements.

FIG. 7—Combination of Recessed and Raised Handle(s) Elements.

In this embodiment, bowl 710 is like bowl 510 in FIG. 5. Here, the graspable elements 716A-D are disposed in indentations formed in the outer wall 712. The indentations may merge into inner wall 720 or they may be formed in the surrounding outer wall 712 or another intermediate structure.

Figure 8:
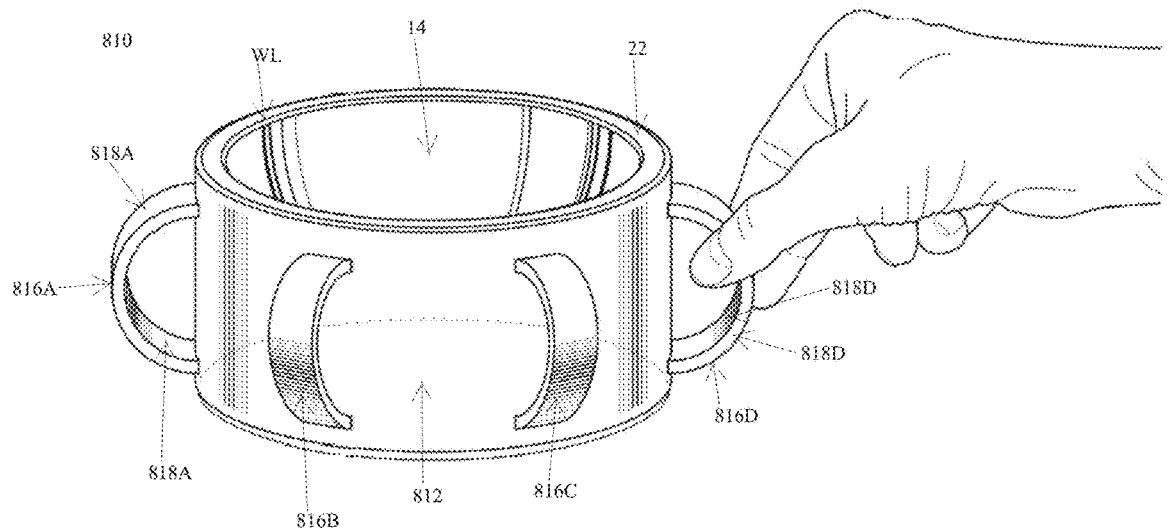
FIG. 8 shows a front perspective view of yet another alternative embodiment of a vessel with graspable elements.

FIG. 8—Raised Handle(s) Elements.

In this embodiment, bowl 810 is like bowl 610 of FIG. 6. Here, the graspable elements 816A-D are vertically oriented handles.

Figure 9:
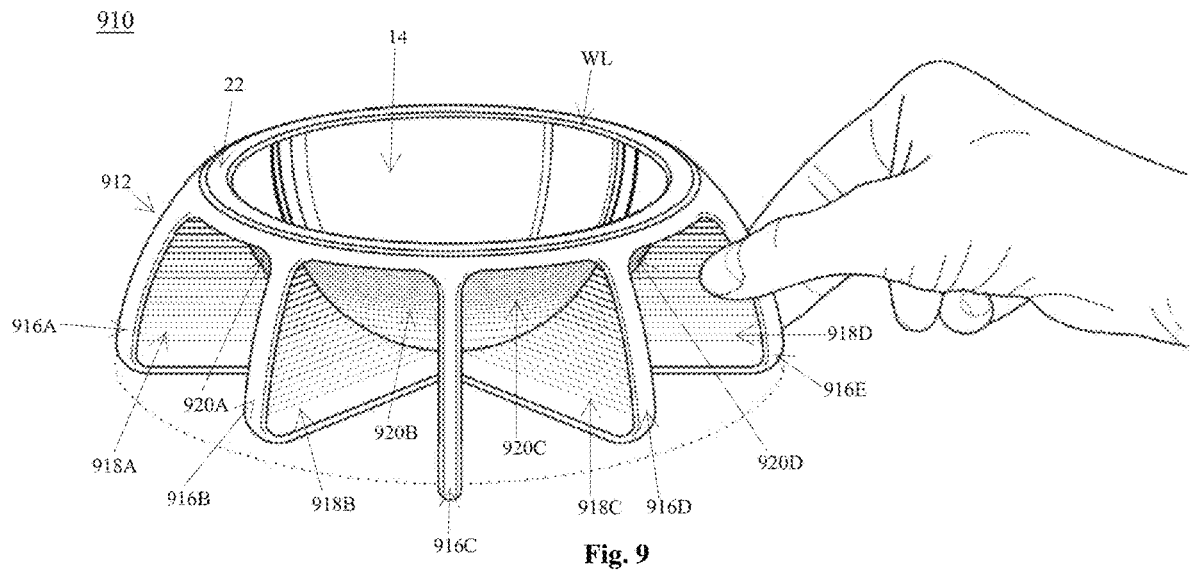
FIG. 9 shows a front perspective view of yet another alternative embodiment of a vessel with graspable elements.

FIG. 9—Bowl Legs Functioning as Handles.

In this embodiment, bowl 910 has an outer wall surface or profile 912 that is circumferentially discontinuous. It is formed from a plurality of spaced apart graspable elements 916A-E in the nature of bars, fins, or other elements that are disposed on inner wall surface 920. In this embodiment, the graspable elements also serve as legs or supports, as well as handles. The graspable elements enable fingers to securely grip the bowl from the outside, while keeping fingers clean. These legs may be the same material as the bowl or a softer/textured material to enhance grip. In this example, the graspable elements are defined by pairs of side wall surfaces, e.g., walls 918A, 918B (respective opposing pair of surfaces not visible). A vertically oriented front wall surface, e.g., 916B is disposed between each pair of side wall surfaces at their exterior ends. The interior ends are disposed on interior wall 920. Each graspable element also has a bottom side that extends outwardly, horizontally from the inner wall until it merges with a front wall surface, e.g., surface 916B. Like in some other embodiments, the graspable elements are equidistantly, circumferentially spaced about the circular perimeter of inner wall 920.

The graspable element/bowl legs may incorporate different shapes and cross sections to be purely functional, functional, and decorative or functional and whimsical as in the case of making the legs resemble those of real of fictitious animals or characters. As seen the inner wall 920 defines a hemispherical or rounded volume for holding bowl contents. The same inner bowl configuration may be applied to any other embodiment disclosed or contemplated herein. As should be apparent from the teachings herein, the outer wall may be shaped to have the same or a quite different outer profile from the inner wall in the case of double-wall bowl constructions or constructions where there is solid between the inner bowl surface and the outer wall surface.

Figure 10:
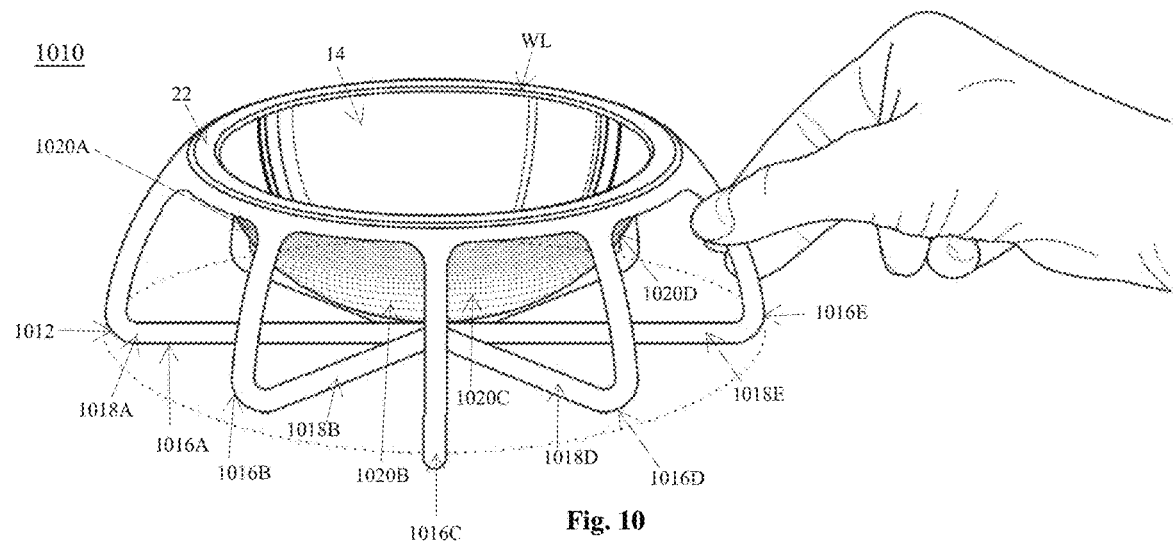
FIG. 10 shows a front perspective view of yet another alternative embodiment of a vessel with graspable elements.

FIG. 10 Bowl Legs Functioning as Handles.

In this embodiment, bowl 1010 is like bowl 910 in FIG. 9. Here, the graspable elements do not have side walls, e.g., side walls 918A, 918B. Instead, the sidewall area is opened to make each graspable element 1016A-E a handle. (Each handle does have its own narrow sidewalls that define the handle opening, e.g., sidewalls 1018A-1018E.)

Figure 11:
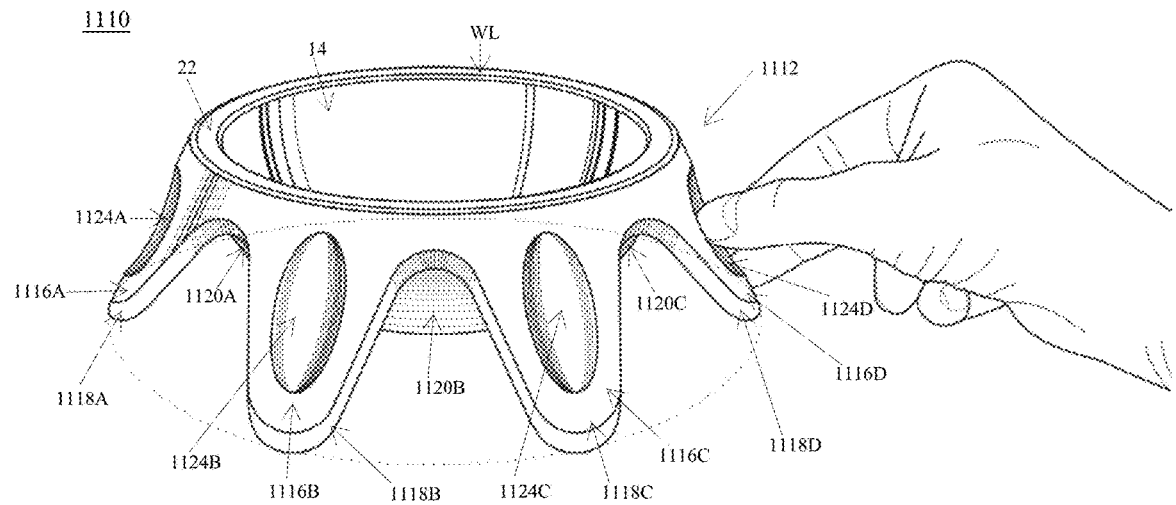
FIG. 11 shows a front perspective view of yet another alternative embodiment of a vessel with graspable elements.

FIG. 11—Bowl Legs Functioning as Handles Utilizing a Combination of Recessed and Raised Elements.

In this embodiment, bowl 1110 is like bowls 910 and 1010 in that the graspable elements 1116A-D also serve as legs or supports. In this case the legs extend vertically downwardly from a top surface of inner wall 1120. The legs are horizontally wider along the front surfaces, e.g., 1118A, 1118C. Indentations 1124A-D optionally may be formed in the front surfaces for enhances grip. Such indentations may be provided in various other embodiments of bowls. Alternatively, in this or any other embodiment, one or more surfaces of a graspable element may have another kind of grip enhancement feature, e.g., a silicone or other rubbery coating or insert, pronounced three-dimensional texture or perforations in the leg or sidewall material for additional grip.

Figure 12:
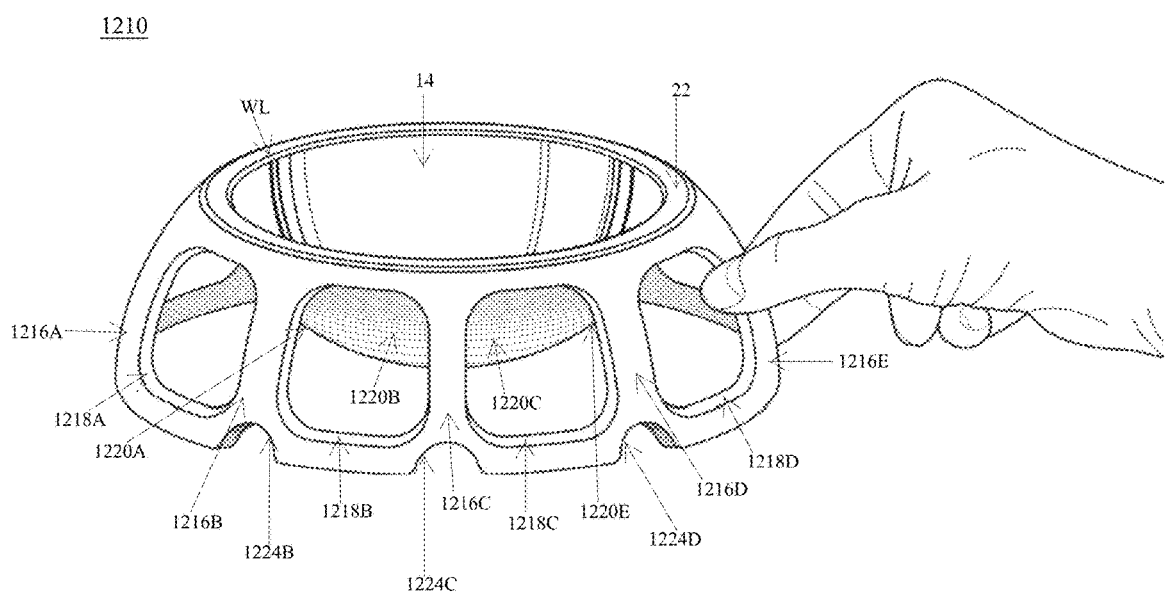
FIG. 12 shows a front perspective view of yet another alternative embodiment of a vessel with graspable elements.

FIG. 12—Bowl Legs Functioning as Handles Utilizing a Combination of Cut Out, Recessed and or Raised Elements.

In this embodiment, bowl 1210 like bowl 1110 in that it has graspable elements/supports 1216A-E that are disposed on just the top portion of inner wall 2020 and downwardly and outwardly therefrom. The graspable elements are interconnected at their bottoms by a ring. The rings may optionally include finger-sized notches or indentations 1224B-1224D so that fingers can be slipped under the bowl to help lift it. The graspable elements 1216A-E are separated by apertures and are generally like graspable elements 516A-B shown in bowl 510 of FIG. 5.

FIG. 13—any Interior and/or Exterior Bowl Shape Combination May Incorporate the Inventive Subject Matter.

FIG. 13 illustrates the taking of a cross-section (cross sections A.-A.) through a representative bowl 1310. (Generally, but not necessarily, the orthogonal cross-section, which is not shown would have a matching cross-section.) It is to be understood that this bowl's particular inner and outer wall profiles may be varied, as indicated in FIGS. 13.1-13.7. The following are some (not all) examples of varying interior and exterior shape combinations that can be incorporated into the inventive subject matter. In any case, the bowl may be open or closed at the bottom, The bowl may be a:
1. A simple single wall construction (open at the bottom);
2. A double wall construction with a closed or open bottom; or
3. A solid-wall construction, with material spanning the inner and outer wall surfaces. (e.g., like a solid wood bowl).

The inner and outer profiles may be the same or different. FIG. 13.1 shows bowls with double wall constructions and closed bottoms 15. Inner wall, bowl surface 14 has a hemispherical or other rounded profile. The outer wall surface has a different profile, which, moving left to right, may range from (1) extending angularly outward from the bottom and then stepping angularly inward at a midsection; (2) truncated cone or tapering from top to bottom; (3) cylindrical; and (4) rounded or hemispherical.

FIG. 13.2 shows outer profiles that are the same or like those of FIG. 13.1. In this case, the inner profile is not completely rounded, it is flat on the bottom.

FIG. 13.3 shows outer profiles that are the same or like those of FIG. 13.1. In this case, the inner profile is rectilinear, not rounded. The inner profile is an inverted truncated cone, i.e., the bowl's bottom is flat, and the vertically oriented walls taper outwardly and openly from the bottom to top.

FIG. 13.4 shows bowls with an inner profile that is cylindrical in combination with outer profiles from FIGS. 13.1-13.3.

FIG. 13.5 shows various combinations of inner and outer profiles discussed above but without closed bottom 15.

FIG. 13.6 represents what could be a solid wood or solid cast (resin or synthetic stone etc.) construction.

FIG. 13.7 shows the same inner and outer profiles as FIG. 13.1 but in this case the bowl has a solid construction, with material infilled between inner surface 14 and outer surface 12.

Although bowls with round perimeters are shown in the Figures, the bowls or other vessels may be fabricated in many other shapes, including square or other polygon, oval, and irregular shapes.

Figure 14:
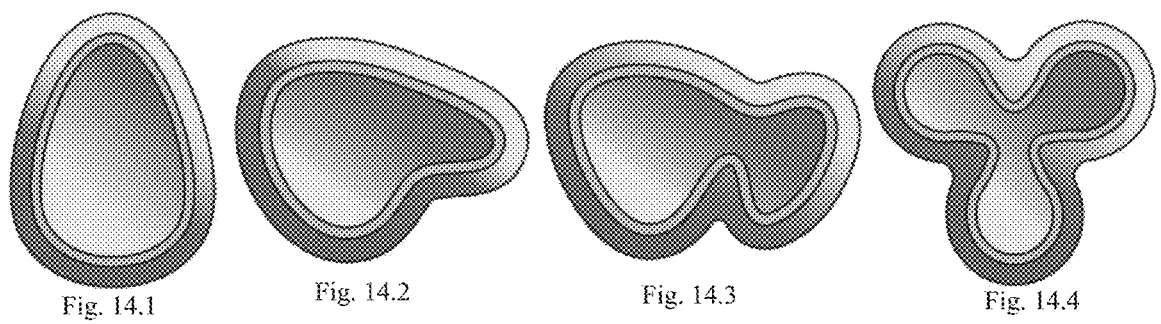
FIG. 14 illustrates a series (FIGS. 14.1-14.4) of representative top view profiles vessels with may have.

Looking at FIGS. 14.1-14.4, the bowl shape, viewed from the top, may be a regular uniform shape, for example, round (FIG. 14.1); square (FIG. 14.2); triangular (FIG. 14.3); and hexagonal (FIG. 14.4), elliptical (not shown), etc.

Figure 15:
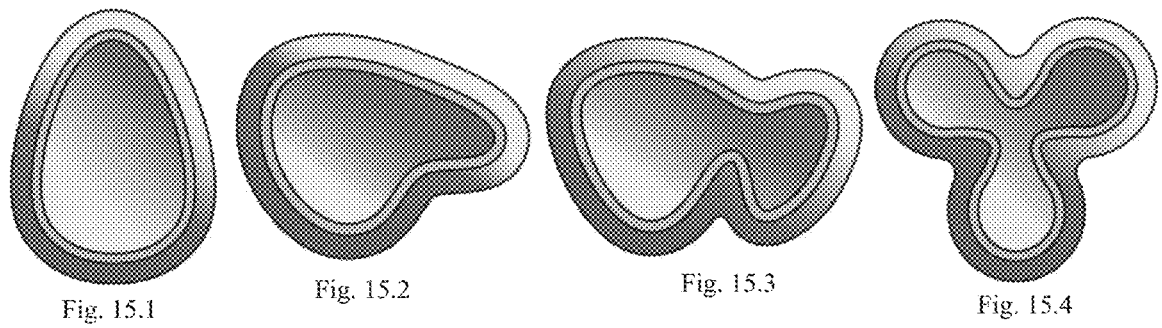
FIG. 15 illustrates another series (FIGS. 15.1-15.4) of representative top view profiles vessels may have.

Looking at FIGS. 15.1-15.4, the bowls or other vessels may have a simple organic shape (e.g., FIG. 15.1), an irregular organic shape (e.g., FIGS. 15.2-15.3), or a complex organic shape (e.g., FIG. 15.4). As examples, the shape can be ovoid (FIG. 15.1); kidney like ((FIG. 15.2); butterfly-like or lobed (FIG. 15.3), i.e., connected in the middle with two shaped cavities on either side of the narrow area, which cavities can be the same or different size or shape; and symmetrically pedaled or lobed around a center point (FIG. 15.4).

As seen in FIGS. 1-15, from a top view, the bowls or vessels have a top perimeter that is concentrically within a larger bottom, ground-facing perimeter. Alternatively, as seen in FIGS. 16-19, the bottom perimeter could be concentrically within a larger top perimeter.

Figure 16:
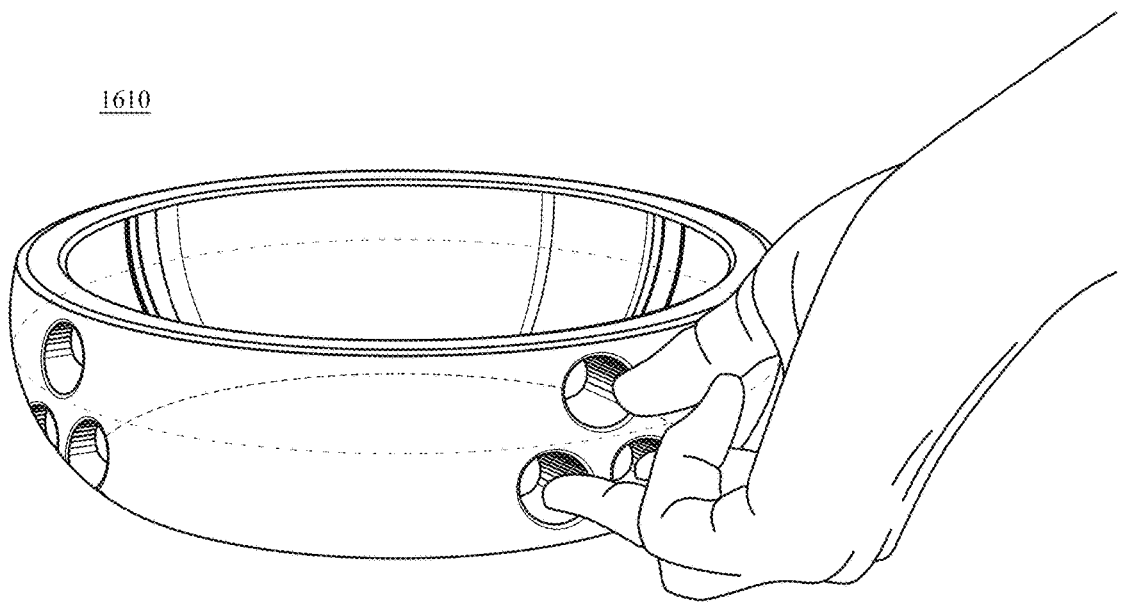
FIG. 16 shows a front perspective view of yet another alternative embodiment of a vessel with graspable elements.

FIG. 16 shows a bowl 1610 with a set of apertured graspable elements like found in a bowling ball, and as also seen in bowl 110 of FIG. 1. The graspable elements are sized and arranged to provide a set of three of more finger holes that are accessible by fingers from a single hand. There is a single top hole and two lower holes. In the case of FIG. 16 there are two, spaced-apart sets of such bowling ball holes. Bowl 1610 has a solid or double-wall construction and a closed bottom.

Figure 17:
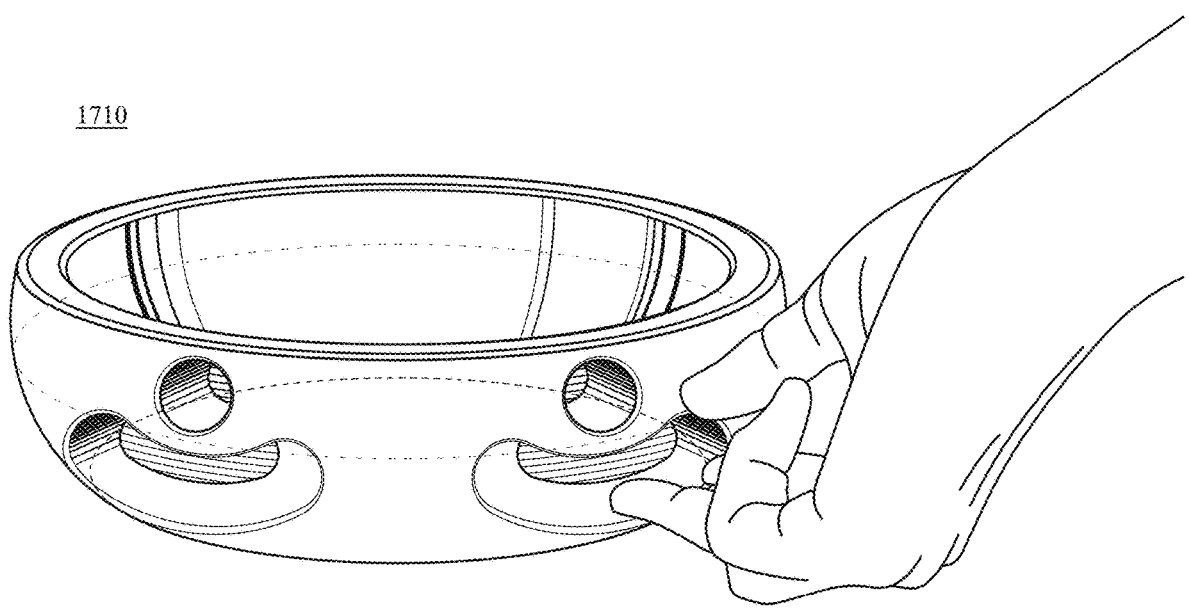
FIG. 17 shows a front perspective view of yet another alternative embodiment of a vessel with graspable elements.

FIG. 17 shows a variation of the bowl 1610 where the bottom two graspable elements are merged together in an elongate, upwardly curving slot that allows two or more fingers entry for grasping.

Figure 18:
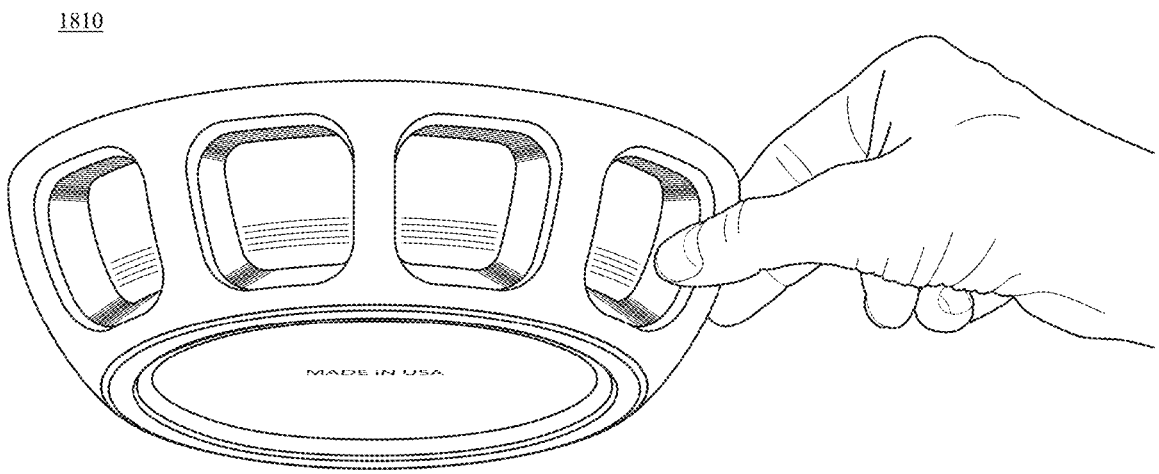
FIG. 18 shows a front, bottom perspective view of yet another alternative embodiment of a vessel with graspable elements.

FIG. 18 shows a bowl 1810 with an arrangement of graspable elements similar to those seen in bowl 1210 of FIG. 12. Bowl 1810 has a solid or double-wall construction and a closed bottom.

Figure 19:
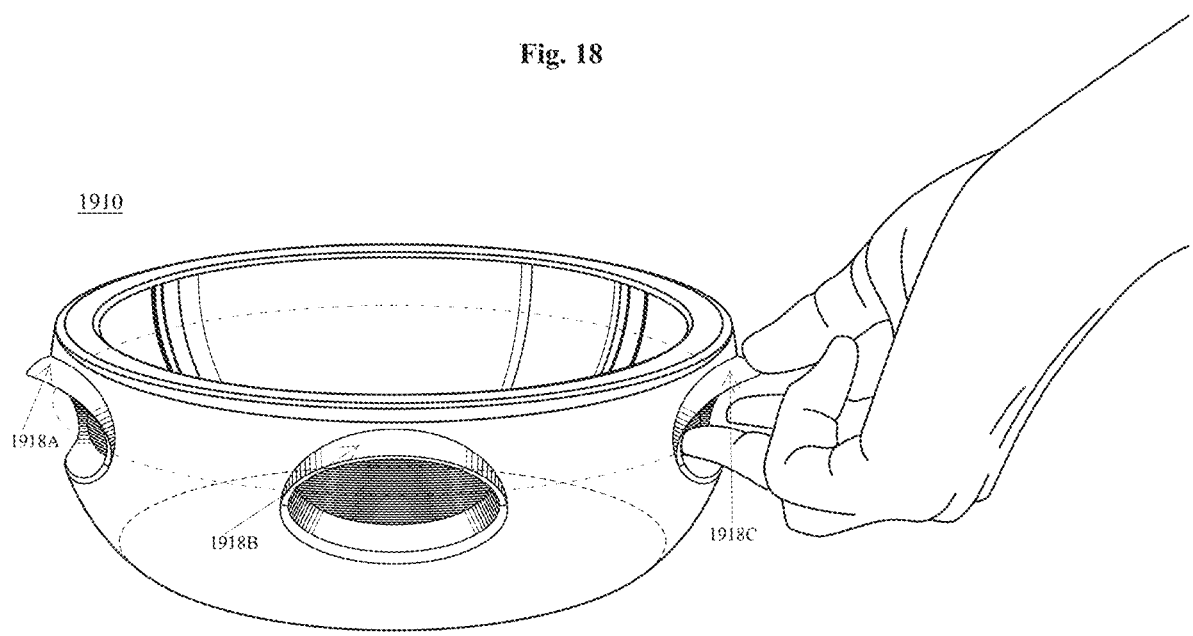
FIG. 19 shows a front perspective view of yet another alternative embodiment of a vessel with graspable elements.

FIG. 19 shows a bowl 1910 with an arrangement of graspable elements that are recessed or apertured somewhat similar to those seen in bowl 710 of FIG. 7. However, instead of vertically oriented sidewalls 718 running vertically down the middle of the aperture, the perimeter of the aperture can have a projecting lip 1918A-C for grasping, the projecting lip can be disposed partially, intermittently or fully around the perimeter.

Methods of Making

As stated above, the bowls and vessels according to the inventive subject matter may be manufactured from a variety of materials, including metals, plastics, ceramic, wood, glass or any combination of multiple materials. Manufacturing may be done using traditional and advanced processes. Stamping, hydro forming, injection molding, casting, laminating (as with bamboo or wood veneers), forging, 3D printing, machining, carving etc.

Persons skilled in the art will recognize that many modifications and variations are possible in the details, materials, and arrangements of the parts and actions which have been described and illustrated to explain the nature of the inventive subject matter, and that such modifications and variations do not depart from the spirit and scope of the teachings and claims contained therein.

All patent and non-patent literature cited herein is hereby incorporated by references in its entirety for all purposes.

As used herein, "and/or" means "and" or "or", as well as "and" and "or." Moreover, any and all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more".

All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed as "a means plus function" claim under US patent law, unless the element is expressly recited using the phrase "means for" or "step for".

The inventor reserves all rights to the subject matter disclosed herein, including the right to claim all that comes within the scope and spirit of the following claims.

The invention claimed is:

1. A bowl vessel comprising: an inner wall surface and an outer wall surface spaced apart from the inner wall surface, wherein the inner wall surface defines an interior volume and the outer wall surface comprises graspable elements;
   said graspable elements comprising at least two sets of finger holes; wherein each set of finger holes includes three finger holes arranged in a substantially triangular pattern with one finger hole oriented toward an open top of the bowl vessel and two finger holes oriented toward a closed bottom of the bowl vessel, and wherein each finger hole extends from the outer wall surface toward the inner wall surface; wherein
   each set of finger holes are angularly and equidistantly spaced apart from each other about a perimeter of the outer wall surface so as to allow a user to grasp and lift the bowl vessel without contacting the interior volume or the closed bottom of the bowl vessel.

2. The bowl vessel of claim 1 wherein the bowl vessel has a toroidal outer profile shape.

3. The bowl vessel of claim 1 wherein the bowl vessel comprises metal, rubber, and/or plastic to impart water imperviousness and shatter proofness to at least the inner wall of the bowl vessel.

4. The bowl vessel of claim 1 wherein the bowl vessel has a double wall construction comprising the inner wall surface and the outer wall, the outer wall surface being spaced from the inner wall surface along a majority of the perimeter of the bowl vessel.

5. The vessel of claim 1 wherein the bowl vessel has a low center of gravity in that a widest portion of the bowl vessel is found in a mid-height to a bottom portion of the vessel.

6. The bowl vessel of claim 1 wherein the bowl vessel has an outer diameter at the bottom of the bowl vessel that is within +/−25% of an inner diameter defined by the inner wall surface at the top edge of the inner wall surface.

7. The bowl vessel of claim 1 wherein the bowl vessel has an outer wall profile and an inner wall profile that is different from the outer wall profile.

8. The bowl vessel of claim 1 wherein at least an outer wall profile of the bowl vessel has a widest portion at a mid-height to a bottom portion of the bowl vessel.

9. The bowl vessel of claim 1 wherein the graspable elements do not extend above the outer wall surface.

10. The bowl vessel of claim 1 wherein there are a plurality of the spaced sets at 120 degrees apart.

11. The bowl vessel of claim 1 wherein the bowl vessel comprises an assembly of multiple pieces.

12. The bowl vessel of claim 11 wherein the pieces are of different materials.

13. The bowl vessel of claim 12 wherein at least one piece comprises plastic and one piece comprises metal.

* * * * *